US005750244A

United States Patent [19]
Christensen et al.

[11] Patent Number: 5,750,244
[45] Date of Patent: May 12, 1998

[54] HIGH STRENGTH POLYMERIC-FIBER COMPOSITES

[76] Inventors: Richard M. Christensen, 388 Paraiso, Danville, Calif. 94526; T. T. Chiao, 1031 Valley Oak Way, Fairfield, Calif. 94533

[21] Appl. No.: 664,036

[22] Filed: Mar. 4, 1991

Related U.S. Application Data

[63] Continuation-in-part of Ser. No. 345,694, May 1, 1989, abandoned.

[51] Int. Cl.⁶ .................................................. B32B 5/14
[52] U.S. Cl. ......................... 428/308.4; 428/311.5; 428/315.5; 428/315.7; 428/317.9; 428/320.2; 428/321.5; 428/323
[58] Field of Search .............................. 428/308.4, 311.1, 428/311.5, 315.5, 315.7, 317.9, 320.2, 321.5, 323, 114, 315.4, 372; 264/45.1, 45.3, 50, 53, 54, DIG. 6

[56] References Cited

U.S. PATENT DOCUMENTS

| | | | |
|---|---|---|---|
| 3,706,614 | 12/1972 | Kirkpatrick et al. | 156/151 |
| 4,244,824 | 1/1981 | Lange et al. | 210/500.29 X |
| 4,259,112 | 3/1981 | Dolowy, Jr. et al. | 419/6 |
| 4,284,683 | 8/1981 | Hipchen et al. | 428/285 |
| 4,444,703 | 4/1984 | Dominguez et al. | 264/45.3 |

*Primary Examiner*—Marion E. McCamish

[57] ABSTRACT

High strength fiber-matrix composite materials are disclosed having low volumetric resistance inclusions in the matrix phase in order to resist transverse cracking of the matrix at those regions where the fibers are in closest proximity. Minute voids, air, solids or liquids serve to absorb the increasing volume change stress without cracking the matrix when the composite is deformed. The suppression of transverse cracking improves the overall performance of the composite.

12 Claims, 1 Drawing Sheet

HIGH STRENGTH POLYMERIC-FIBER COMPOSITES

RELATED INVENTIONS

This is a continuation-in-part application based on U.S. patent application Ser. No. 07/345,694, filed May 1, 1989, now abandoned.

BACKGROUND OF THE INVENTION

This invention relates to fiber reinforced composite materials and a modification in making them. More particularly, it relates to the improvement of strength of such composites.

Modern fiber reinforced materials are a combination of two phases, generally called the fiber phase and the matrix phase. The purpose of the matrix is to bind the fibers together to form a monolithic solid that can bear loads in two or three dimensions. The fiber phase is essentially a one-dimensional medium with the fiber diameter much smaller than its length. In fact, the fiber length is effectively infinite compared with fiber diameter. The high level of fiber stiffness or strength which bears load in one dimension must be combined with the matrix phase to form a structure that will bear load in more than one dimension. This is commonly achieved by forming layers of uni-directional fibers with a matrix phase into a single layer called a lamina, and then placing one lamina on top of another to form a laminate.

The mechanical performance of fiber reinforced composites is strongest axially along the fibers. To give strength in all directions, composites are often made by laminating layers of fibers laid at angles less than 90 degrees from the direction of the preceding layer. Multiple layers can then assure that fibers extend in many directions in the final sheet.

It is also known that all fibers must be completely wetted by the polymer resin impregnant and adequately bonded or else strength will be reduced. The absence of resin matrix along the length of a fiber means that the transverse strength, that is, radially from the fiber, will be very low where there is no bond between resin and fiber. Uncontrolled voids in a laminate are considered to be defects or flaws, because they are the focal points of stress-induced cracking in the surrounding resin matrix. To remove voids, various processing steps, such as the combination of pressure and vacuum, are used in making composites. In aerospace applications, typical specifications require a void content of less than 1% by volume in composite material structures. The presence of voids leads to significant reduction in the matrix dominated mechanical properties. See, e.g., Harper, et al., "A Note on the Effects of Voids Upon the Hygral and Mechanical Properties of AS4/3502 Graphite/Epoxy", 21 J. Composite Materials 280 (March 1987).

Transverse strength (90 degrees to the fiber direction) is always the limiting factor in individual layers of a laminated composite because the tensile strength of the fiber far exceeds the fiber-matrix bond strength or the matrix strength itself. Stated another way, the fiber bears most of the load. A fiber may be extended in a longitudinal direction 1% to 4% at the level of failure. However, a composite may be extended only 10% to 20% of the longitudinal amount before failure when stressed in a transverse direction. In other words, a composite can be extended only 0.1% to 0.5% of its length in a transverse direction.

The failure of resin-fiber composites generally can be traced to cracks in the polymerized resin at the narrowest points between fibers. Macroscopic failure of the laminate is preceded by transverse cracking within the individual lamina. The failure proceeds to adjacent narrow gaps between fibers and then grows to cause delamination and ultimately leads to a macroscopic rupture through all layers of a composite sheet.

The chain of failures are initiated by the transverse cracking in the matrix phase.

There is a need to suppress the microscopic transverse cracking of the matrix phase at the narrow dimensions between fibers.

SUMMARY OF THE INVENTION AND OBJECTS

The present invention reduces the tendency of the matrix phase to crack at the transverse spans between adjacent fibers by introducing special types of inclusions in the resin matrix.

In high performance composites, the fiber phase ranges from 40% to more than 75% of the volume of the composite, meaning that the fibers are close together, and in some cases are almost touching. A transverse load on the lamina tends to pull the fibers apart, increasing the separation between fibers. This separation has to be accommodated only by the matrix phase, since the polymer is much more compliant than the fiber phase. The separation of fibers induces a volume growth in the matrix phase in the region where the fibers are closest together. The introduction of low stiffness inclusions in the matrix phase allows the volume growth without cracking.

Any stress can be decomposed into shear change and volume change. Polymers can take shear change much better than volume change. On a microscopic level, the change in the region between adjacent fibers is limited by volumetric change, not shear. Thus, substituting more soft or rubbery polymers in composites does not help because elastomers only modify the shear properties and do not affect the way polymers respond to volume changes.

The inclusions contemplated by this invention are of low resistance to volume increase. That is, they will not resist increases in volume. Strain induced by an applied load that normally would cause the matrix to crack is now accommodated by the inclusions. The inclusions need not be spherical, although generally speaking they are. There should be no corners or vertices which would produce stress concentration effects similar to those that cause cracks. The inclusions may be voids though they need not be. All that is required is that they have low resistance to volumetric expansion.

It is also a requirement that the inclusions in the matrix be small in relation to the spacing between fibers in a composite. Typically the fibers used in high performance composites range from 5 to 15 microns in diameter. The inclusions must be much smaller than the spacing between the densely packed fibers. That is, in absolute terms comparing to fibers presently in use for composites, the maximum dimension of the inclusion must be much less than one micron in size. Larger inclusions cause the composite strength to be reduced, because they behave more like flaws (the absence of bonding) than merely accommodating expansion on a microscopic scale.

Another important aspect of the invention is that the inclusions should be reasonably uniformly distributed in the matrix phase to accommodate stress wherever it occurs in the regions where fibers are closest together. We have found that the inclusions must be more than 10% of the volume of the matrix phase to achieve the desired effect. Volume less than 10% means that less stress can be accommodated by volumetric expansion.

3

The composition of the inclusions may be anything that has much lower resistance to volume increase than the matrix phase itself. The purpose of the inclusions is to contribute to the volume increase under load instead of the homogenous polymeric matrix phase, which has a tendency to crack (fail) rather than expand.

It is an object of this invention to make composite fiber-matrix materials that have comparable load-carrying capacity and greatly increased integrity to deformation strain.

It is another object of this invention to make composites of enhanced strength in static load conditions as well as under fatigue conditions involving the repeated application of loads in terms of millions of cycles.

It is another object of the invention to improve the toughness of fiber-matrix composites by allowing the material to absorb more energy before complete failure.

DESCRIPTION OF THE PREFERRED EMBODIMENTS

The fibers used in the composites may be any having strength in one direction. Among the fibers now in wide use are graphite and carbon fibers; glass fibers; aramid polymer fibers; polyolefin fibers; boron, silicon carbide and other high performance inorganic fibers.

The matrix phase may be any of the known polymers used for composites, including thermosetting and thermoplastic resins. By way of example, thermosetting resins include epoxies, polyesters, vinylesters, polyimides, neoprene, and bismaleimides. Examples of thermoplastic resins that are suitable are nylon, polyethylene, polyetheretherketone, and polyphenylene sulfite.

The inclusions may be low stiffness solids or fluids, voids or any gas that will permit the expansion to take the strain of deformation from the polymer. The inclusions may be introduced into the matrix prior to polymerization by any convenient technique.

By way of example, the inclusions may be dispersed in the resin phase by suitable means, such as (1) chemical blowing agents that generate gas through thermal decomposition in the resin melt, (2) gas injection into the melt, (3) mechanical dispersion of air into the resin like whipped cream, or (4) volatilization of a liquid through the exothermic heat of reaction.

Specific examples of gases include air and steam. Liquids may be emulsifying agents like sulfonic acid, anionic surface-active agents, such as sodium oleate, non-ionic surface-active agents, such as polyethylene glycol or polyvinyl alcohol. Solids that may be used include cationic surface-active agents such as quaternary ammonium compounds, guanidine and thiuronium salts, and silica or clays having sub-micron particle sizes.

The size of the inclusion using either liquids or gases can be controlled by regulating the ambient pressure on the resin.

The only requirements for the inclusions are that they should be nearly spherical in shape, sub-micron in size, and not reactive with, or a diluent for, the resin. Many other examples of non-reactive, non-diluent, sub-micron, spherical inclusions will occur to those having skill in the art.

Figure 1:
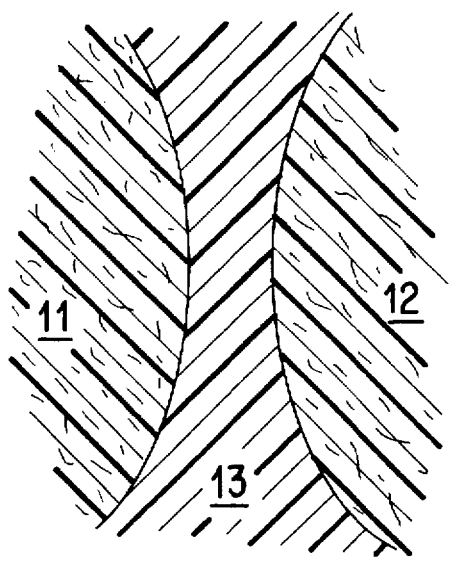
FIG. 1 is a schematic enlarged view of a composite fiber-matrix as prepared by existing prior art methods.

FIG. 1 shows a pair of fibers 11 and 12 bonded together with a matrix 13 of neoprene.

Figure 2:
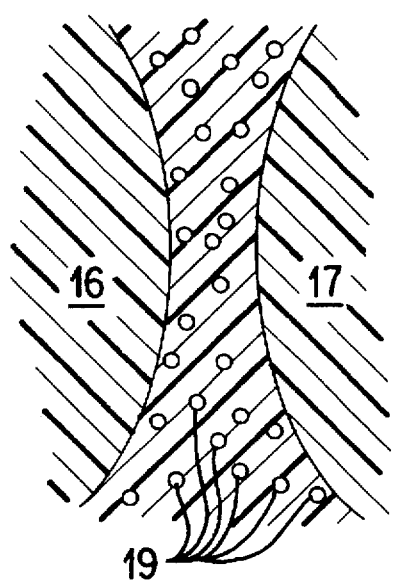
FIG. 2 is a schematic enlarged view of a composite fiber-matrix according to the present invention.

FIG. 2 shows a pair of fibers 16 and 17 bonded together with a matrix 18 of neoprene, just as in FIG. 1. However, the embodiment of FIG. 2 differs from that of FIG. 1 in that the matrix has pores 19 which give volumetric expansion or contraction inclusions to reduce the risk of cracking the matrix in the composite.

EXAMPLE 1

A simulated composite was made representing two rigid fiber filaments bonded by a neoprene phase with voids in one case and one without voids. FIG. 1 shows the testing simulated geometry. The geometry was that of a larger absolute scale and the use of rigid fixtures simulating stiff fiber filaments.

The porous version had 60% of the volume of the matrix as voids. The composite was extended in each case in a transverse direction to the point of failure. The composite with the voids was able to withstand a strain at failure six times greater than that in the non-porous matrix.

EXAMPLE 2

Another method involves mixing the resin with a solid phase or micro-balloons which will not bond to the resin phase. When the resin is required to expand it will simply pull away from the solid inclusion.

EXAMPLE 3

As another example, water is mixed with the resin phase during processing forming the sub-micron inclusions. Water remains as a liquid phase during the temperature and pressure program of processing but will diffuse out after cure completion.

EXAMPLE 4

Voids of more than one size may be used to add strength to composites. For example, a fiber-matrix bundle may be formed from fibers in a resin containing tiny voids in the sub-micron range. These voids provide strength to the bundle because the voids are small in relation to the fiber volume. In addition to the bundle of fibers, there is a second matrix of resin only that binds the fiber-matrix bundles. This second matrix has much larger voids, exceeding one micron in size and visible to the naked eye, because of the pliability of the resin. The sub-micron voids are in the fiber-matrix bundle and the visible pores or voids are in the resin matrix between bundles.

It will be apparent to those having ordinary skill in the art that other variations on the materials and techniques described here are available. It is intended that all such equivalent means, materials and methods are within the scope of the invention here claimed.

We claim:

1. In a fiber-matrix resinous composite material comprising a resin phase selected from the group consisting of epoxies, polyesters, vinylesters, polyimides, neoprene, bismaleinides, nylon, polyethylene, polyetheretherketone, and polyphenylene sulfite and a fiber phase selected from the group consisting of carbon, glass, aramid polymer, polyolefin, boron and silicon carbide, said fiber phase of high density, aligned continuous fibers between 40% and 75% of the volume of the composite, the improvement comprising providing at least 10% of the volume of the matrix of evenly distributed non-diluent inclusions in the matrix, said inclusions selected from the group consisting of low stiffness solids or fluids, voids or gas that will permit expansion to take the strain of deformation from the polymer, said inclusions having low volumetric resistance and a sub-micron size.

2. A composite as in claim 1, wherein the fibers are spaced apart at least one micron and inclusion size is less than the distance between fibers.

3. A composite as in claim 1, wherein the inclusions are voids filled by air or vacuum.

4. A composite as in claim 1, wherein the inclusions are solids or liquids which allow volumetric expansion.

5. A composite as in claim 1, wherein the inclusions are microballoons.

6. A composite as in claim 1, wherein the inclusions are selected from a group consisting of air, steam, emulsifying agents, anionic surface-active agents, non-ionic surface-active agents, cationic surface active agents, silicon or clay.

7. A composite fiber-matrix resinous material comprising bundles of aligned fibers in a resin-matrix having at least 10% of the volume of the matrix of inclusions of voids less than one micron in diameter and a second resin matrix binding said bundles in a spaced relationship, the second matrix having inclusions of low volumetric resistance with a maximum dimension exceeding one micron.

8. A method of improving the strength of an aligned fiber-matrix resinous composite comprising a resin phase selected from the group consisting of epoxies, polyesters, vinylesters, polyimides, neoprene, bismaleinides, nylon, polyethylene, polyetherether, keotene, and polyphenylene sulfite and a fiber phase selected from the group consisting of carbon, glass, aramid polymer, polyolefin, boron, and silicon carbide comprising introducing at least 10% of the volume of the matrix of low volumetric resistance non-diluent inclusion selected from the group consisting of low stiffness solids or fluids, voids or gas that will permit expansion to the strain of deformation from the polymer, having a sub-micron size into the matrix to accomodate volumteric expansion at the regions of closest contact of fibers.

9. A method as in claim 8, wherein the inclusions are introduced by reacting a blowing agent in the matrix.

10. A method as in claim 8, wherein the inclusions are introduced by liquid entrainment.

11. A method as in claim 8, wherein the inclusions are introduced by mixing microballoons into the matrix prior to impregnating it into the fibers.

12. A method as in claim 11, wherein the inclusions are selected from a group consisting of air, steam, emulsifying agents, anionic surface-active agents, non-ionic surface-active agents, cationic surface active agents, silicon or clay.

* * * * *